`US008979211B2`

(12) United States Patent
Marshall et al.

(10) Patent No.: US 8,979,211 B2
(45) Date of Patent: Mar. 17, 2015

(54) DEMOUNTABLE PIN AND COLLET ASSEMBLY AND METHOD TO SECURELY FASTEN A RANGING ARM TO A LONGWALL SHEARER USING SUCH ASSEMBLY

(71) Applicants: Don Burgener, Lyman, WY (US); Solvay Chemicals, Inc., Houston, TX (US)

(72) Inventors: Shawn Marshall, Green River, WY (US); Jody Don Burgener, Lyman, WY (US)

(73) Assignee: Solvay Chemicals, Inc., Houston, TX (US)

( * ) Notice: Subject to any disclaimer, the term of this patent is extended or adjusted under 35 U.S.C. 154(b) by 0 days.

(21) Appl. No.: 13/648,833

(22) Filed: Oct. 10, 2012

(65) Prior Publication Data
US 2013/0093236 A1 Apr. 18, 2013

Related U.S. Application Data

(60) Provisional application No. 61/547,602, filed on Oct. 14, 2011.

(51) Int. Cl.
*F16B 33/00* (2006.01)
*E21C 35/00* (2006.01)
*F16B 17/00* (2006.01)
*F16B 5/02* (2006.01)
*E21C 27/02* (2006.01)
*E21C 27/34* (2006.01)
(Continued)

(52) U.S. Cl.
CPC ............... *F16B 5/0258* (2013.01); *E21C 35/00* (2013.01); *E21C 27/02* (2013.01); *E21C 27/34* (2013.01); *F16B 13/0858* (2013.01); *F16B 13/068* (2013.01); *F16B 29/00* (2013.01); *F16B 35/005* (2013.01)
USPC ................ 299/10; 299/1.6; 299/42; 403/261; 403/297; 403/303; 403/305; 403/314; 279/2.02; 279/4.06; 279/4.07

(58) Field of Classification Search
CPC ......... E21C 27/02; E21C 27/34; E21C 35/00; F16B 5/0258
USPC ...................... 299/1.6, 10, 33, 42, 43, 53, 54; 403/261, 297, 303, 305, 308, 314, 403/374.1–374.4; 279/2.02–2.07, 279/4.07–4.09, 4.1, 4.11, 4.12
See application file for complete search history.

(56) References Cited

U.S. PATENT DOCUMENTS

| 1,292,543 | A | 1/1919 | Van Slyke |
| 2,548,978 | A | 4/1951 | Jelinek |

(Continued)

FOREIGN PATENT DOCUMENTS

| GB | 681181 A | 10/1952 |
| WO | WO 2011059349 A2 | 5/2011 |

*Primary Examiner* — John Kreck
*Assistant Examiner* — Carib Oquendo
(74) *Attorney, Agent, or Firm* — Beatrice C. Ortego

(57) ABSTRACT

A pin-and-collet assembly, a longwall shearer comprising a ranging arm attached to a lifting bracket with such assembly, a method for the secure fastening of one piece to another, such as securely fastening the ranging arm to the lifting bracket of a longwall shearer using such assembly as a bushing, and a method for longwall mining of ore, such as trona, using such longwall shearer. This assembly is easy to install, does not have to be tightened during longwall operation of an ore panel, and is also demountable when it is time to stop the longwall mining operation and time to remove/replace the ranging arm for maintenance and/or when the end of the ore panel is reached.

20 Claims, 4 Drawing Sheets

(51) Int. Cl.
   *F16B 13/08* (2006.01)
   *F16B 13/06* (2006.01)
   *F16B 29/00* (2006.01)
   *F16B 35/00* (2006.01)

(56) References Cited

U.S. PATENT DOCUMENTS

| | | |
|---|---|---|
| 3,099,411 A | 7/1963 | Geen |
| 3,841,771 A | 10/1974 | Shankwitz et al. |
| 3,954,299 A | 5/1976 | Hartley |
| 4,055,367 A | 10/1977 | Jarvis |
| 4,088,370 A | 5/1978 | Jarvis et al. |
| 4,382,633 A | 5/1983 | Ludlow et al. |
| 4,507,005 A * | 3/1985 | Siewert et al. .................. 403/16 |
| 5,320,443 A * | 6/1994 | Lien et al. ..................... 403/154 |
| 5,921,561 A | 7/1999 | Cedarberg, III |
| 6,322,280 B1 | 11/2001 | Coyne |
| 7,812,606 B2 | 10/2010 | Burns |
| 2009/0120234 A1 * | 5/2009 | Aare .............................. 74/580 |
| 2010/0301660 A1 | 12/2010 | Niederriter et al. |
| 2011/0044752 A1 * | 2/2011 | Oertley et al. ................ 403/161 |

* cited by examiner

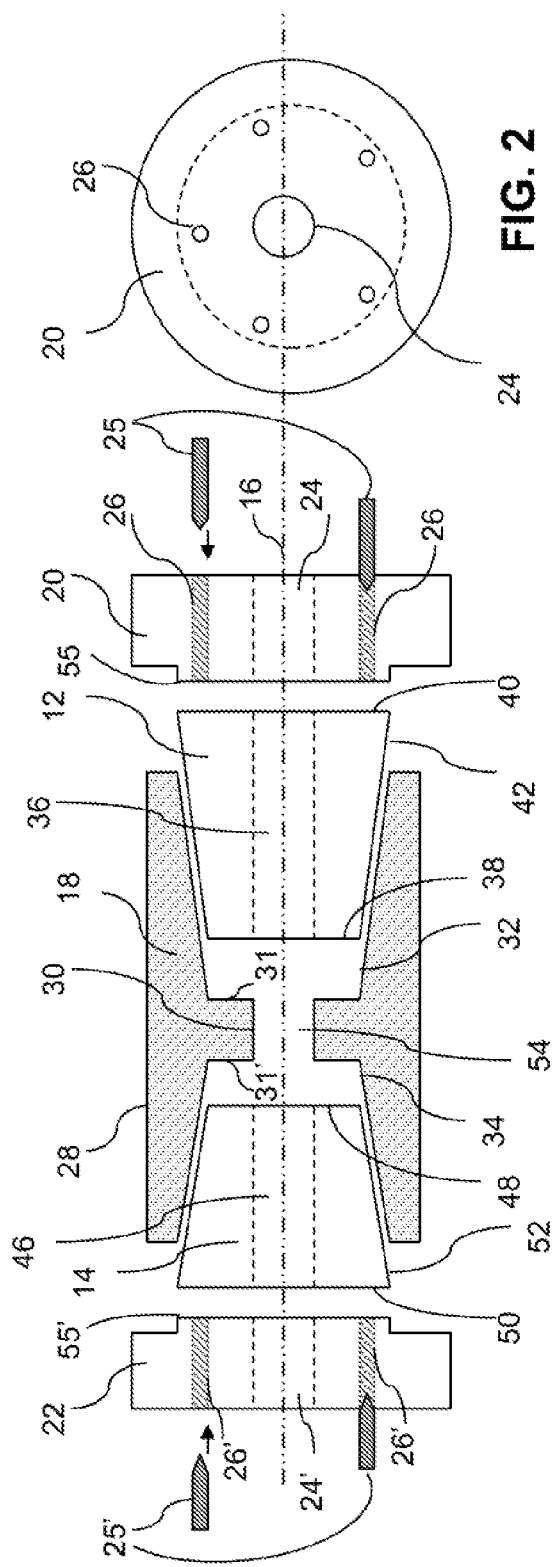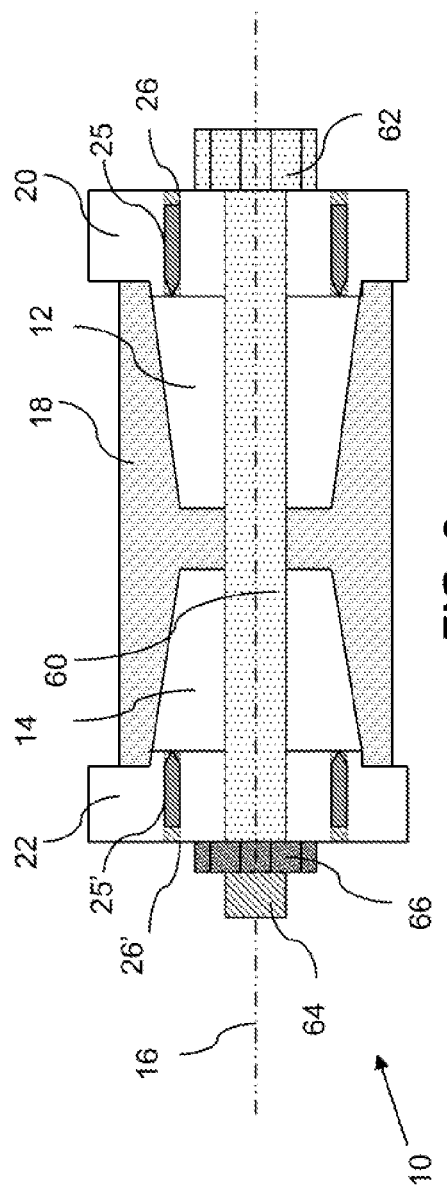

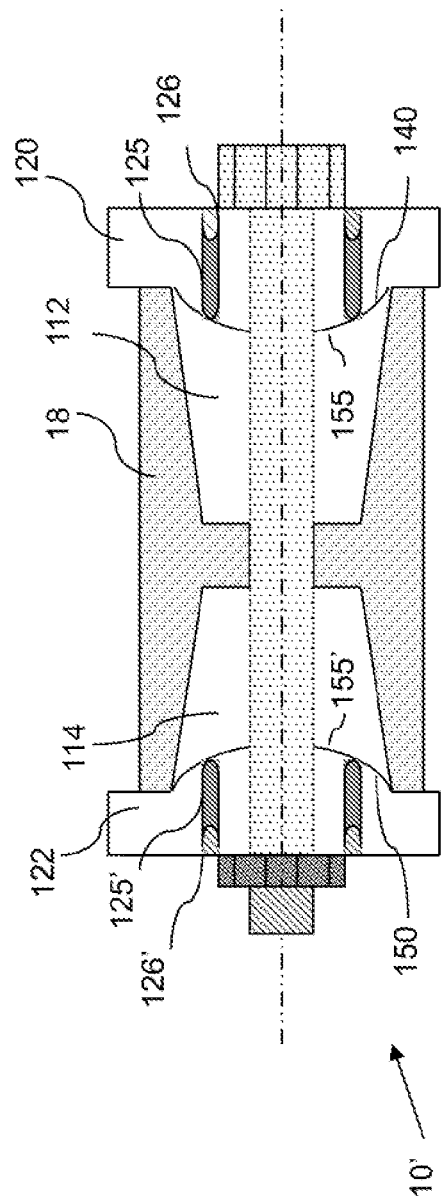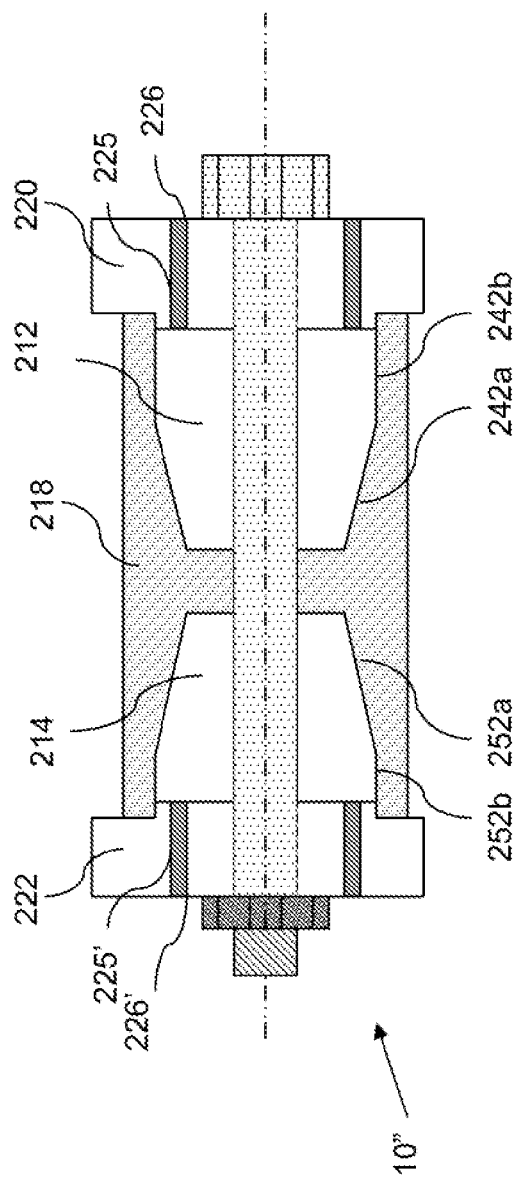

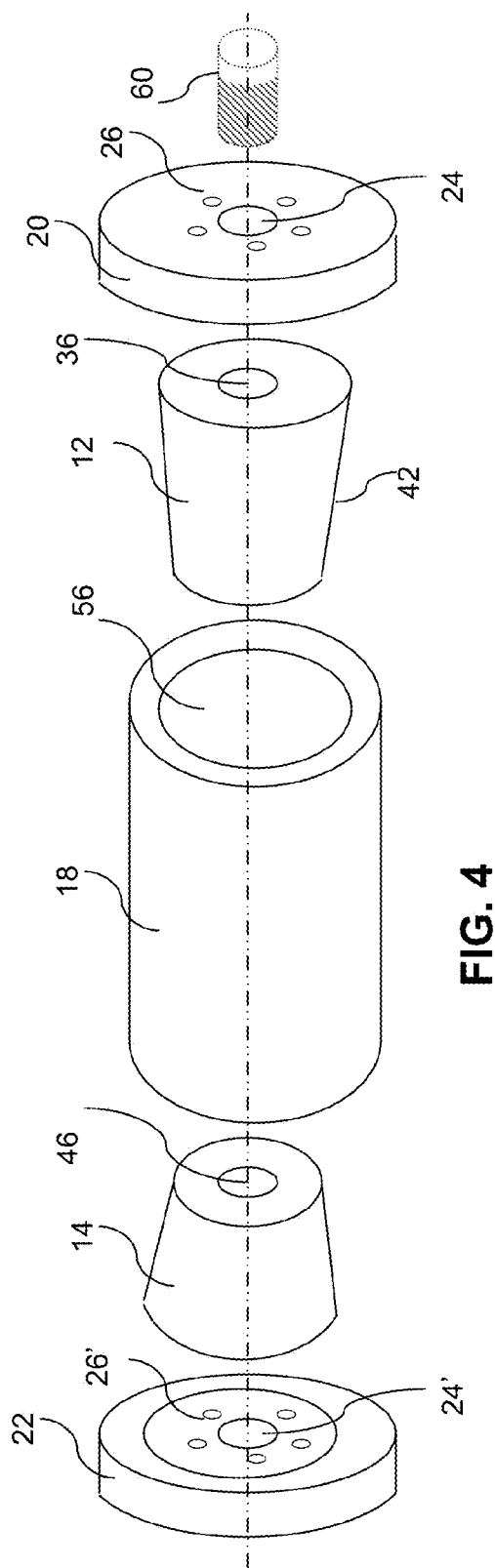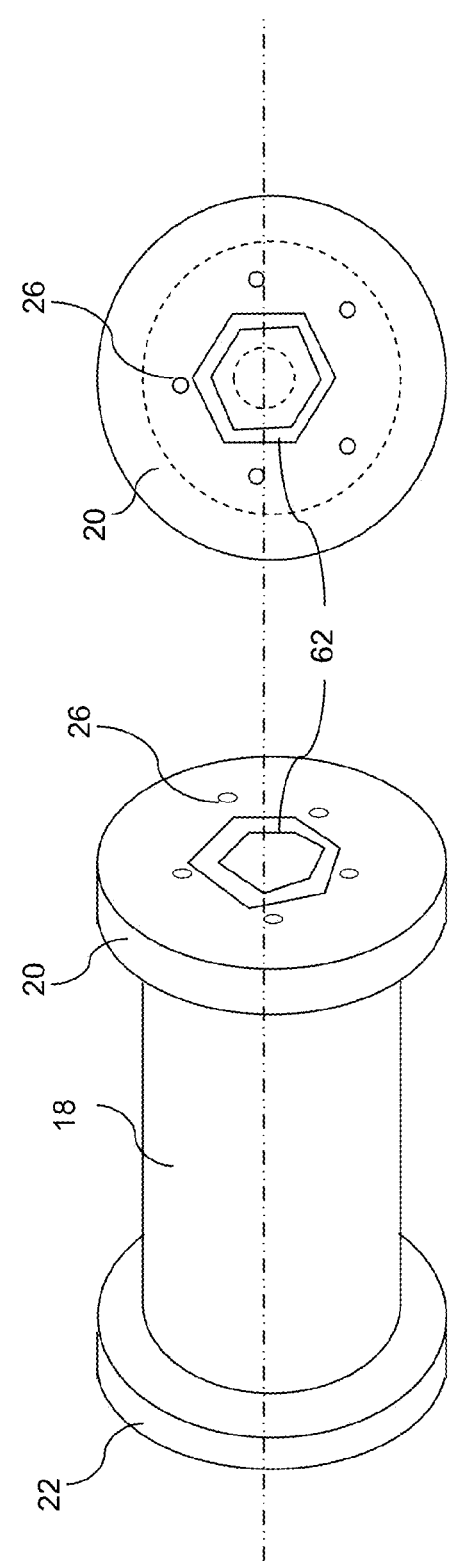
FIG. 4
FIG. 5
FIG. 6

DEMOUNTABLE PIN AND COLLET ASSEMBLY AND METHOD TO SECURELY FASTEN A RANGING ARM TO A LONGWALL SHEARER USING SUCH ASSEMBLY

CROSS-REFERENCE TO RELATED APPLICATIONS

The present application claims priority to U.S. provisional application No. 61/547,602 filed Oct. 14, 2011, the whole content of this application being incorporated herein by reference for all purposes.

FIELD OF THE INVENTION

The present invention relates to a demountable pin-and-collet assembly which is used to attach two pieces together and a longwall shearer comprising such assembly. The present invention further relates to a method for the secure fastening of one piece to another using such assembly, such as fastening a ranging arm to a lifting bracket of a longwall shearer, and a method for the mining of ore, such as trona, using such longwall shearer.

BACKGROUND OF THE INVENTION

Large deposits of mineral trona in southwestern Wyoming near Green River Basin have been mechanically mined since the late 1940's and have been exploited by five separate mining operations over the intervening period. The nominal depth below surface of these mining operations ranges between approximately 800 feet to 2000 feet. All operations practiced some form of underground ore extraction using techniques adapted from the coal mining industry.

A variety of different systems and mining techniques (such as longwall mining, shortwall mining, solution mining, room-and-pillar mining, or various combinations) exist for mining ore from underground seams, such as trona seams. Longwall mining, shortwall mining, and room-and-pillar mining require miners and heavy machinery to be underground. Although any of these various mining techniques may be employed to mine trona ore, when a mechanical mining technique is used, it is preferably longwall mining.

A longwall mining system typically comprises a continuous mining machine used where extended portions or longwalls of seam are desired to be mined. Longwall mining includes mining parallel entries into the seam to be mined and connecting those entries with one or more primary passages. Such arrangement defines the longwall pillar(s) or panel(s) to be mined. Such longwall panels may, depending upon the seam configuration, extend 300-1,200 feet (ca. 100-400 m) for the width of the face to be mined and as high as a mile for the length of the panel to be mined. The roof of the primary passages is usually supported by movable roof supports during the mining of the exposed "face" of the longwall pillar.

Typical longwall mining techniques employ a mining machine that is known in the industry as a longwall "shearer". The ore is cut from the mining face by the shearer. This machine typically can weigh from 75 to 120 tons and comprises a main frame, housing the electrical functions, tractive motive units to move the shearer along the face and pumping units (to power both hydraulic and water functions). The longwall shearer's mobile frame is generally elongated and is supported on floor-mounted tracks that are adjacent and substantially parallel to the mine face.

There are three main types of longwall shearers: double-ended ranging-drum shearer, single-ended ranging-drum shearer, and single-ended fixed-drum shearer, the double-ended ranging-drum shearer being the most common for trona mining.

For the double-ended ranging-drum shearer, at either end of the main shearer frame are fitted ranging arms which can be ranged vertically up down by means of hydraulic rams. A laterally-extending rotary-driven drum which is fitted with a plurality of mining cutting bits or teeth (e.g., 40-60 teeth) attached thereto is pivotally attached to each ranging arm. Within the ranging arms are housed very powerful electric motors (typically up to 1500 HP) which transfer their power through a series of gears within the frame and the arms to the drum mounting locations at the extreme ends of the ranging arms where the cutting drums are. The rotary-driven cutting drums are rotated at a speed of 20-50 revolutions per min to cut the ore from the seam.

Each rotary driven toothed drums supported on a ranging arm is brought into engagement with the mine face to dislodge ore material therefrom and cuts the ore face into pieces as the shearer frame is moved back and forth on the track in front of the mine face. The cut ore pieces fall into a face conveyor that is usually attached to the floor-mounted tracks and extends parallel to the longwall face. The face conveyor discharges the pieces of cut ore material onto other conveying systems to transport the material from the seam out of the mining area. As the mine face recedes, the roof support, the face conveyor, the track assembly, and the shearer are advanced toward the face to enable the shearer to continue mining.

The operation of the shearer is well known in the mining art and, as such, will not be discussed in detail herein. However, the skilled artisan will appreciate that as the shearer reaches the end of a longwall face, the cutting operation has to be turned around. In some instances, the entire shearer may have to be turned around for the ore face to be cut in both directions of travel. Or the height of the rotary arms needs to be adjusted. When the end of the panel is reached, the longwall mining operation has to be moved to another panel, and the shearer's cutting arms need to be removed from the shearer and reinstalled onto the shearer to start mining a new face.

In most commercial longwall shearers, the ranging arm is welded solid to a lifting bracket which is connected to the hydraulic ram. The welded system does not allow for the arm and brackets to be flipped and changed from a headgate arm to a tailgate arm. This means the ranging arm that is fit to run on one end of the shearer body cannot be moved to the other end of the shearer.

In other shearers, a removable cylindrical-shaped bushing with a single straight pin has been used to fasten the ranging arm to the lifting bracket when inserted into a cylindrical hole. This bushing has a welded cap on one end machined into the pin, and a bolted cap on the other end. This cylindrical-shaped bushing connecting the arm and bracket allows the easy removal of the shearer arm from the bracket and motor housing for maintenance and/or for longwall panel move. However the straight pin in the bushing often comes loose during longwall mining operation. This loose pin causes increased friction with surrounding parts due to its unintended movement, and as a result causes damage to the cylindrical hole into which the bushing is inserted. The cross-section of the hole can be deformed into an ovoid 'egg' shape, so that the bushing no longer fastens securely the ranging arm to the lifting bracket. The shearer ranging arm then vibrates and wobbles during mining operation requiring mining operation to stop in order for the bushing to be repetitively tightened. In some instances though, the vibrations/wobbling of the arm is such as to cause the bushing to fail completely or the pin to break.

Although this foregoing issue has been and will be described in terms of trona mining, it may also apply to any longwall mine from which a non-combustible ore (e.g., evaporite or metal/non-metal ore) or coal is extracted.

The present invention thus provides a remedy to some of the problems associated with past bushing designs and further can minimize downtime during longwall mining operation and/or during maintenance for shearer turn-around and/or during shearer move to a new ore panel.

SUMMARY OF THE INVENTION

The present assembly comprises two pins inside of a collet (also termed 'pre-assembly'), wherein the pins-and-collet pre-assembly is sandwiched between two end caps, and wherein both pins and collet are brought in contact together with a bolt passing through the holed centers of the pins, of the collet, and of the end caps. The bolt loads the pins inside the collet, and then fasteners inserted into holes bored through the end caps load against the caps to keep the bolt in place so that it does not come loose.

One first aspect of this invention relates to an assembly for fastening two pieces together, comprising:

a first pin comprising a first central axis bore therethrough;

a second pin comprising a second central axis bore therethrough;

a collet comprising an inner collar defining a central axis aperture and two sections divided by said collar, said collet comprising the first section adapted to receive the first pin, said collet further comprising the second section adapted to receive the second pin;

a first end cap comprising a central axis hole and being adapted to cover one outer end of the first pin, wherein the first end cap has a plurality of first peripheral holes, each first peripheral hole being adapted to receive a first fastener;

a second end cap comprising a central axis hole and being adapted to cover an outer end of the second pin, wherein the second end cap has a plurality of second peripheral holes, each second peripheral hole being adapted to receive a second fastener;

a bolt adapted to pass through the central axis holes of one of the end caps, the central axis bore of one of the pins, the collar central axis aperture, the central axis bore of the other pin, and the central axis holes of the other end cap, said bolt comprising at least one threaded end onto which a nut is threaded to tighten the pins into place inside the collet;

a plurality of first fasteners adapted to be inserted into the plurality of first peripheral holes of the first cap and to exert a force on the first pin; and a plurality of second fasteners adapted to be inserted into the plurality of second peripheral holes of the second cap and to exert a force on the second pin;

wherein each of the pins, the collet, and each of the end caps have a common central axis.

The central axis bores of the pins, the collar central axis aperture, and the central axis holes of both end caps should be sized to allow the bolt to pass therethrough.

The first pin comprises a first outer circumferential surface and the first collet section has an inner surface; and the first collet section is preferably adapted to receive the first pin so that the inner surface of such first collet section makes contact with the outer circumferential surface of the first pin.

The second pin comprises a second outer circumferential surface and the second collet section has an inner surface; and the second collet section is preferably adapted to receive the second pin so that the inner surface of the second collet section makes contact with the outer circumferential surface of the second pin.

In some embodiments, at least one pin is tapered, and the collet section adapted to receive such tapered pin is also tapered with a matching taper angle. In this manner, the inner tapered surface of the tapered collet section makes contact with the outer circumferential tapered surface of the respective tapered pin that such collet section is adapted to receive. In preferred embodiments, both of the first and second pins are tapered, and each collet section adapted to receive such tapered pin is also tapered with a taper angle matching that of the tapered pin such collet section is adapted to receive.

In alternate embodiments, only a portion of at least one pin and of each collet section receiving such pin is tapered with matching taper angle, the remainder of the pin and of the collet section being cylindrical, so that the tapered portion of the inner surface of each collet section makes contact with the tapered portion of the outer circumferential surface of the pin that such collet section is adapted to receive.

In some embodiments, the outer end of at least one pin which is in contact with a face of an end cap may be flat. In such instance, the face of the end cap being in contact with the flat outer end of the pin is also flat. In alternate embodiments, the outer end of at least one pin which is in contact with a face of an end cap may be concave. In such instance, the face of the end cap which is in contact with such concave outer end of the pin is convex.

In some alternate albeit less preferred embodiments, the plurality of first and/or second peripheral holes in the end caps are not threaded, and the corresponding first and/or second fasteners are non-threaded fasteners.

In preferred embodiments, the first and/or second fasteners are threaded, and the first and/or second peripheral holes on the end cap(s) receiving such first and/or second fasteners, respectively, are also threaded with a matching threading. In such instance, the first and/or second threaded fasteners may be headed screws or may be headless screws. In preferred embodiments, the first and second threaded fasteners are set screws, and each of the first and second peripheral holes is threaded to receive one set screw.

According to one embodiment of the present invention, the first peripheral holes are positioned on the first end cap such that the tip of each first fastener to be inserted therethrough comes in contact with the outer end surface of the first pin, and the second peripheral holes are positioned on the second end cap such that the tip of each second fastener to be inserted therethrough comes in contact with the outer end surface of the second pin.

According to preferred embodiments of the present invention, the first peripheral holes are equally spaced along one circumference on the first end cap so as to even out the exerted force on the outer end of the first pin, and the second peripheral holes are equally spaced along one circumference on the second end cap so as to even out the exerted force on the outer end of the second pin.

According to one alternate or additional embodiment of the present invention, the first and second pins have different lengths.

According to yet one other alternate or additional embodiment of the present invention, the first and second end caps have different heights and/or widths.

According to yet one other alternate or additional embodiment of the present invention, the first and second end caps have same heights or same widths or both.

A particular variant of the first aspect of this invention relates to an assembly for fastening a ranging arm to a lifting bracket of a longwall shearer, said assembly comprising:

a first tapered pin comprising a first central axis bore therethrough and a first outer circumferential tapered surface;

a second tapered pin comprising a second central axis bore therethrough and a second outer circumferential tapered surface;

a collet comprising an inner collar defining a central axis aperture and two tapered sections divided by said collar, said collet comprising the first tapered section adapted to receive the first tapered pin, wherein the inner surface of such first collet tapered section makes contact with the outer circumferential surface of the first tapered pin, said collet further comprising the second section adapted to receive the second pin, wherein the inner surface of the second collet tapered section makes contact with the outer circumferential surface of the second tapered pin;

a first end cap comprising a central axis hole and being adapted to cover one flat end of the first tapered pin, wherein the first end cap has a plurality of first peripheral holes, each first peripheral hole being externally threaded to receive a fastener which is a set screw with matching threading;

a second end cap comprising a central axis hole and being adapted to cover one flat end of the second tapered pin, wherein the second end cap has a plurality of second peripheral holes, each peripheral hole being externally threaded to receive a fastener which is a set screw with matching threading;

a bolt adapted to pass through the central axis holes of one of the end caps, the central axis bore of one of the tapered pins, the collar central axis aperture, the central axis bore of the other tapered pin, and the central axis holes of the other end cap, said bolt comprising at least one threaded end onto which a nut is threaded to tighten the tapered pins into place inside the collet;

a plurality of first fasteners to be threaded into the plurality of first peripheral holes of the first cap and to exert a force on the first pin; and a plurality of second fasteners to be threaded into the plurality of second peripheral holes of the second cap and to exert a force on the second pin;

wherein each of the tapered pins, the collet, and each of the end caps has a common central axis.

The central axis bores of the tapered pins, the collar central axis aperture, and the central axis holes of both end caps should be sized to allow the bolt to pass therethrough.

The collet first section may be adapted to receive the first pin so that the inner surface of such first collet section makes contact with the outer circumferential surface of the first pin.

The second collet section may be adapted to receive the first pin so that the inner surface of such second collet section makes contact with the outer circumferential surface of the second pin.

According to some embodiments of this aspect of the present invention, the first peripheral holes are positioned on the first end cap such that the tip of each first fastener to be inserted therethrough comes in contact with the outer end surface of the first pin, and the second peripheral holes are positioned on the second end cap such that the tip of each second fastener to be inserted therethrough comes in contact with the outer end surface of the second pin.

According to alternate or additional embodiments, the first and second tapered pins have different lengths.

According to yet other alternate or additional embodiments of such aspect of the present invention, the first and second end caps may have different heights and/or widths.

In some embodiments, each of the first and second fasteners are set screws, and each of the first and second peripheral holes is threaded to receive one set screw. In such embodiments, the first set screw holes are preferably equally spaced along one circumference on the first end cap so as to even out the exerted force on the outer end of the first pin, and the second set screw holes are equally spaced along one circumference on the second end cap so as to even out the exerted force on the outer end of the second pin.

A second aspect of the present invention relates to a longwall shearer, comprising a ranging arm attached to a lifting bracket with the assembly according to any embodiment of the present invention.

A third aspect of the present invention relates to a method for securely fastening a piece to another (such as a ranging arm to a lifting bracket of a longwall shearer), comprising using the assembly according to any embodiment of the present invention as a bushing. In a variant of such aspect, a method for securely fastening a ranging arm to a lifting bracket of a longwall shearer comprises the following steps:

inserting the collet into a bore on the shearer;

inserting the first and second pins on either side of the collet, so that the inner surface of the first collet section comes in contact with the outer circumferential surface of the first pin and the inner surface of the collet second section comes in contact with the outer circumferential surface of the second pin;

after insertion of the first and second pins into the collet, covering one end of the collet with one end cap and covering the other end of the collet with the other end cap;

inserting a bolt through the central axis hole of the first cap, the central axis bore of the first pin, the central axis aperture of the collar, the central axis bore of the second pin, and through the central axis hole of the second cap;

fastening the bolt by threading a nut on at least one threaded end;

inserting a first fastener in each first peripheral hole in the first end cap; and inserting a second fastener in each second peripheral hole in the second end cap.

In a second variant of such aspect in which the two pins and the two collet sections are tapered and in which the fasteners on the end caps are threaded, the method may include:

inserting the collet into a bore on the shearer;

inserting the first tapered pin and the second tapered pin on either side of the collet, so that the inner tapered surface of the collet's first tapered section comes in contact with the outer circumferential tapered surface of the first tapered pin, and the inner tapered surface of the collet's second tapered section comes in contact with the outer circumferential tapered surface of the second tapered pin;

after insertion of the first and second tapered pins into the collet, covering one end of the collet with one end cap and covering the other end of the collet with the other end cap;

inserting a bolt through the central axis hole of the first cap, the central axis bore of the first tapered pin, the central axis aperture of the collar, the central axis bore of the second tapered pin, and through the central axis hole of the first cap;

fastening the bolt by threading a nut on at least one threaded end; and inserting the threaded fasteners in each set of threaded peripheral holes in the first and second caps to exert a force on a respective outer end of the first and second pins.

The outer end of the first and second pins may be flat (preferred) or concave.

The collet is inserted through a bore of the lifting bracket and motor shroud housing.

Yet a fourth aspect of the invention relates to a method for longwall mining ore, which comprises securely fastening a ranging arm of a longwall shearer to a lifting bracket of the longwall shearer on a motor housing side using the assembly according to any embodiment described herein of the present invention as a bushing; and cutting ore from a mine longwall face with a toothed drum (preferably rotary-driven) positioned at the end of the ranging arm.

The secure fastening of the ranging arm is preferably carried on the motor housing side.

The cut ore pieces are typically conveyed away from the longwall face.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions or methods do not depart from the spirit and scope of the invention as set forth in the appended claims.

BRIEF DESCRIPTION OF THE DRAWINGS

For a detailed description of the preferred embodiments of the invention, reference will now be made to the accompanying drawings which are provided for example and not limitation, in which:

FIG. 1 illustrates an exploded side view of assembly in an unassembled state according to some embodiments of the present invention;

FIG. 2 illustrates a transverse view through the end cap of the assembly of FIG. 1;

Figure 7:
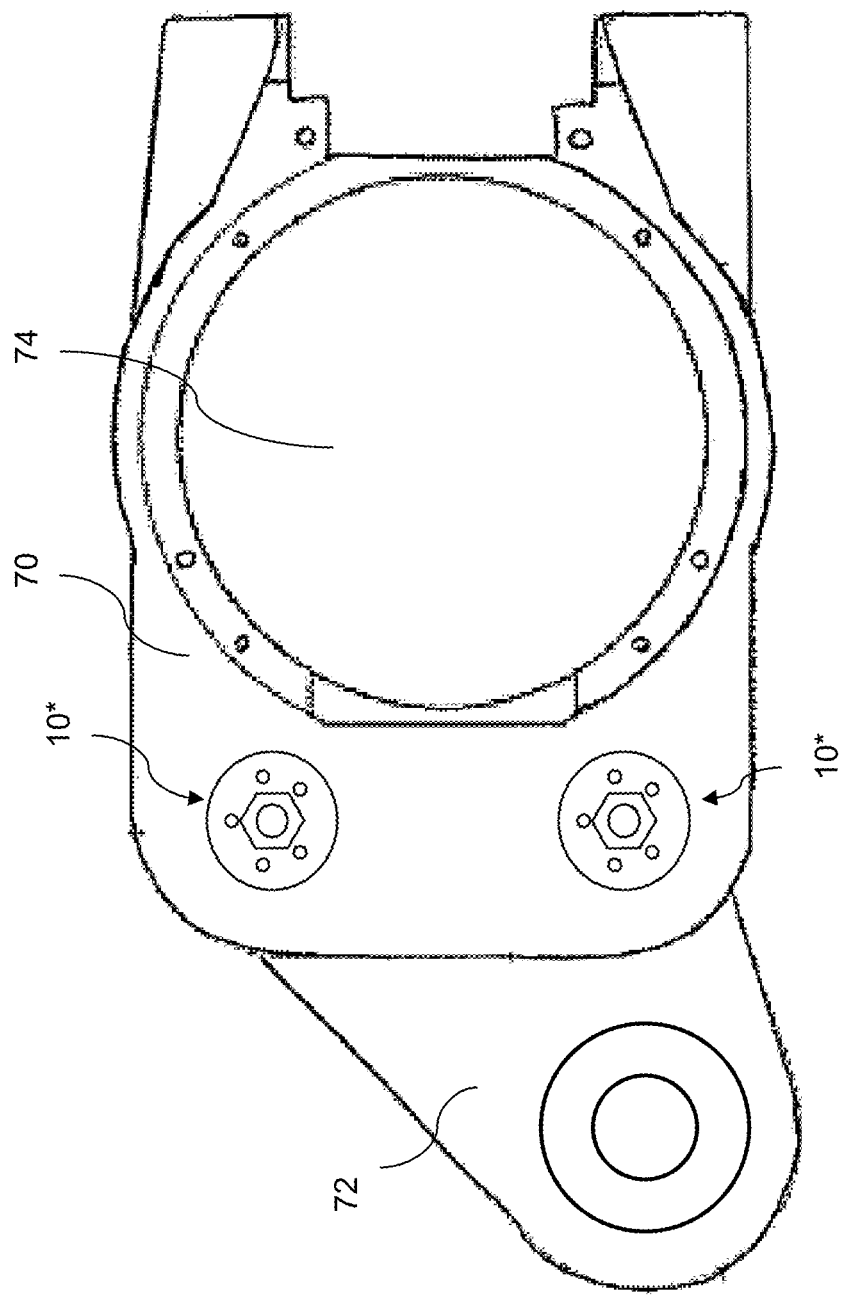

each of FIGS. 3a, 3b and 3c illustrates a side view of an assembly in an assembled state according to various embodiments of the present invention;

FIG. 4 illustrates an isometric view of an assembly in an unassembled state according to some embodiments of the present invention;

FIG. 5 illustrates an isometric view of an assembly in an assembled state according to some embodiments of the present invention; and FIG. 6 illustrates a top view of the assembly of FIG. 5; and FIG. 7 illustrates a side view of a shearer ranging arm attached on the motor housing side to a lifting bracket of a longwall shearer via two demountable assemblies according to some embodiments of the present invention.

On the figures, identical numbers correspond to similar references.

Drawings have are not to scale or proportions. Some features may have been blown out or enhanced in size to illustrate them better.

DETAILED DESCRIPTION OF THE PREFERRED EMBODIMENTS

In the following description, a set of elements includes one or more elements. A plurality of elements includes two or more elements. Any reference to an element is understood to encompass one or more elements. Each recited element or structure can be formed by or be part of a monolithic structure, or be formed from multiple distinct structures.

The following detailed description illustrates embodiments of the present invention by way of example and not necessarily by way of limitation.

In FIG. 1, an assembly comprises a first tapered pin 12, a second tapered pin 14, a collet 18, a first end cap 20 adapted to cover one flat end 40 of the first tapered pin 12, and a second end cap 22 adapted to cover one flat end 50 of the second tapered pin 14. Each of tapered pins, the collet, and each of the end caps have a common central axis 16. The first and second caps 20 and 22 have each a central axis hole 24, 24' respectively which is bored therethrough and sized to allow a single bolt (not shown in FIG. 1) to pass therethrough. The bolt has an external diameter slightly lower than the internal diameter of such central axis holes 24, 24'. The central axis hole 24' of the second pin 14 preferably has the same internal diameter than the central axis hole 24 of the first pin 12. Each of the first and second caps 20, 22 also has a plurality of small-sized threaded holes 26, 26', respectively, bored all the way through. Each threaded hole 26, 26' is externally threaded to receive a set screw (not illustrated) with matching threading. The threaded holes 26' of the second pin 14 may have the same internal diameter than the threaded holes 26 of the first pin 12, but not necessarily. The threaded holes 26' of the second pin 14 may have the same length as the threaded holes 26 of the first pin 12, but not necessarily.

The collet 18 comprises an inner cylindrical-shaped collar 30 defining a central axis aperture and two tapered sections divided by such collar, said collet comprising the first tapered section adapted to receive the first tapered pin 12 and the second tapered section adapted to receive the second tapered pin 14, wherein each of the inner tapered surfaces 32, 34 of the respective tapered collet sections makes contact with the outer circumferential tapered surface of the respective pin which each collet section has received.

The collet 18 comprises an outer circumferential cylindrical surface 28.

The inner cylindrical-shaped collar 30 of collet 18 is protruding transversely relative to two tapered collet sections, the cylindrical-shape collar 30 being located between these two tapered sections. The collar 30 has two flat sides 31, 31' which are donut-shaped.

The inner cylindrical-shaped collar 30 may be centrally located with respect to the outer circumferential cylindrical surface 28, such that the collar 30 would define two tapered sections of equal length. The inner collar 30 may be off-center which would define two tapered collet sections of different lengths. The first (front-end) tapered section has a first inner circumferential tapered surface 32 and the second (back-end) tapered section has a second inner circumferential tapered surface 34. The first inner tapered surface 32 and/or the second inner tapered surface 34 of the inner tapered sections of the collet may have a taper angle (as measured from a line parallel to the central axis 16) to be from 2 to 30 degrees. The first inner tapered surface 32 and the second inner tapered surface 34 may have the same taper angle; or these two taper angles may be different. In preferred embodiments, the first inner tapered surface 32 of the first tapered section has a smaller taper angle than the second inner tapered surface 34 of the second tapered section.

The first tapered pin 12 has a central axis bore 36 which is sized to allow the same single bolt (not shown in FIG. 1) to pass therethrough. This bolt may have an external diameter slightly smaller than the internal diameter of the central axis bore 36 of pin 12. The first tapered pin 12 comprises two flat donut-shaped ends 38, 40, the larger end 40 being adapted to be entirely covered by the first cap 20. The first tapered pin 12 has an outer circumferential tapered surface 42. The first tapered pin 12 is sized to be inserted into the front end of the collet 18, i.e., the first inner tapered surface 32 of the first tapered section of collet 18 is configured to receive the first tapered pin 12 and to make contact with the outer circumferential tapered surface 42 of pin 12.

The second tapered pin 14 has a central axis bore 46 which is sized to allow the same single bolt (not shown in FIG. 1) to pass therethrough. This bolt may have an external diameter slightly lower than the internal diameter of such central axis bore 46. The second tapered pin 14 comprises two flat donut-shaped ends 48, 50, the larger end 50 of these flat donut-shaped ends being adapted to be entirely covered by the second cap 22. The second tapered pin 14 has an outer circumferential tapered surface 52. The second tapered pin 14 is sized to be inserted into the back end of the collet 18, i.e., the second inner tapered surface 34 of the second tapered section of the collet 18 is configured to receive the second tapered pin 14 and to make contact with the outer circumferential tapered surface 52 of pin 14.

During assembly of the pins 12 and 14 with the collet 18, the smaller flat donut-shaped end 48 of the second pin 14 is to make contact with the flat donut-shaped side 31' of the protuding collar 30, while the smaller end 38 of the first pin 12 is to make contact with the other flat donut-shaped side 31 of the collar 30. The diameter of the smaller ends 38, 48 of pins 12, 14, respectively, is preferably equal or slightly smaller (preferably by a few mm) than the diameter of the flat sides 31, 31' of the collar 30.

The first and second pins 12, 14 may have the same length or may have different lengths (wherein the length of each pin may be measured from a line parallel to the central axis 16 from one flat end to the other flat end of the pin). The ratio of the length of the first pin 12 to the length of the second pin 14 may be from 2:1 to 1:2, preferably from 3:2 to 2:3 or from 4:3 to 3:4. The length of the first pin 12 is preferably longer than the length of the second pin 14. The length of such pins is generally determined by the actual length of the bore into which the assembly is fastened.

The larger donut-shaped ends 40, 50 of respective first and second tapered pins 12, 14 may have different diameters, but preferably these donut-shaped ends 40, 50 of pins 12, 14 have the same outer diameter.

The smaller donut-shaped ends 38, 48 of respective first and second tapered pins 12, 14 may have different diameters, but preferably these donut-shaped ends 38, 48 have the same outer diameter.

The collar 30 of collet 18 forms a central axis aperture 54 whose diameter would generally be slightly bigger (generally by less than 1 mm) than the external diameter of a bolt which is to be inserted through the assembly (see for example bolt 60 in FIG. 3). The diameter of the aperture 54 created by the collar 30 is preferably the same as the diameter of the central axis bores 36, 36' of tapered pins 12, 14, respectively, and/or of the central axis holes 24, 24' of the end caps 20, 22, respectively.

The collet 18 may be sized such that the length of the outer circumferential cylindrical surface 28 may be from 4 to 15 inches, preferably from 6 to 12 inches, more preferably from 7 to 10 inches. The diameter of the outer circumferential cylindrical surface 28 may be from 5 to 15 inches, preferably from 7 to 12 inches, more preferably from 8 to 10 inches. The length of such collet is generally determined by the actual length of the bore into which the collet is inserted. The collet is preferably inserted into the bore of a lifting bracket and motor shroud housing of a longwall shearer.

The pins 12, 14 may be sized such that the diameter of the outer larger donut-shaped flat ends 40, 50 may be from 3 to 12 inches, preferably from 4 to 10 inches, more preferably from 6 to 9 inches. The pins 12, 14 may be sized such that the diameter of the inner smaller donut-shaped flat ends 38, 48 may be at least 0.5 cm or at least 0.5 inch smaller than the diameter of the opposite outer larger donut-shaped flat ends 40, 50 of pins 12, 14; for example the diameter of the inner pin flat ends 38, 48 may be from 2.5 to 11.5 inches.

End caps 20, 22 may be of the same height, or may have different heights. Preferably, the second (back-end) cap 22 has a smaller height than the first (front-end) cap 20 (as illustrated in FIG. 1).

The first (front-end) cap 20 may have a thin protuding surface 55 as illustrated in FIG. 1, which is to come in contact with the outer flat end 40 of the first tapered pin 12. The second (back-end) cap 22 may also have a thin protuding surface 55' which is to come in contact with the outer flat end 50 of the second tapered pin 14. The projection height of either or both of the protuding surfaces 55, 55' may be a few millimeters to less than a centimeter.

The set screws 25, 25' may have a variety of tip (point) types selected from the group consisting of flat point, domed point, cone point, cup point, knurled cup point, and extended point, the cone point being illustrated in FIG. 1 and FIG. 3a and the cup point being illustrated in FIG. 3b. The set screws (25, 25') preferably comprise a cup point tip or a knurled cup point tip. The set screws (25, 25') may be made with a variety of drive styles selected from the group consisting of the following: straight slot, hex socket, external hex, external square, and Bristol spline. The set screws (25, 25') preferably comprise a hex socket head.

The set screws 25, 25' may be sized from millimeter to centimeter range for their outer diameter (e.g., from 0.5 to 5 cm, preferably from 1 to 3 cm, more preferably from 1.2 to 2 cm).

FIG. 2 illustrates a transverse view of an assembly similar to that of FIG. 1, in which the first end cap 20 is shown with the central axis hole 24 and a plurality of small-sized peripheral holes 26, each of which being adapted to receive a fastener (not illustrated). The peripheral holes 26 may be externally threaded to receive a threaded fastener for example a set screw with matching threading. There are five (5) small-sized peripheral holes 26 illustrated in FIG. 2, but a number of 4 would be acceptable, or a number greater than 5 may also be used. The second end cap 22 with the central axis hole 24' and a plurality of small-sized peripheral holes 26' could be illustrated similarly as in FIG. 2. The diameter of the peripheral holes 26, 26' are generally smaller than the diameter of the central axis holes 24, 24', respectively.

The number of fasteners on either end cap (e.g., set screws 25, 25') necessary to secure the bolt 60 into place may vary, but at a minimum, there should be at least four (4) fasteners in the assembly. The number of fasteners inserted into both caps 20 and 22 is preferably 5, but a higher number of fasteners may be used.

The small peripheral holes (26, 26') are preferably arranged in a evenly-distributed pattern along at least one circumference, so that the fasteners (25, 25') exert a uniform force on the pins; but the arrangement of the peripheral holes (26, 26') on either or both of the end caps 20, 22 does not have to meet a specific pattern. In practice, it is easier to equally space the peripheral holes 26, 26' along one circumference on caps 20, 22 so as to even out the exerted force on the pins.

FIG. 3a illustrates a side view of a pin-and-collet assembly 10 in an assembled state according to some embodiments of the present invention. The front end of collet 18 defines a front (first) aperture (see such aperture 56 illustrated in FIG. 4) with the inner circumferential tapered surface 32 which matches the taper angle of the first pin 12 but which is generally sized bigger in surface area than the outer circumferential tapered surface 42 of the first pin 12. Similarly, the back end of collet 18 defines a back (second) aperture (not illustrated in FIG. 3a) with the inner circumferential tapered surface 34 which matches the taper angle of the second pin 14 but which is generally sized bigger in surface area than the outer tapered surface 52 of the second pin 14. Thus in assembled state, the first pin 12 is inserted into the tapered front aperture of the collet 18 and the second pin 14 is inserted into the tapered back aperture of the collet 18, so as to create a pins-and-collet pre-assembly which comprises a central axis bolt hole consisting of bore 36 of first pin 12, aperture 54 of collar 30, and bore 46 of second pin 14. The pins 12 and 14 do not extend through the collar 30 of the collet 18. Rather, the small flat (inner) end 38 of pin 12 butts to the flat donut-shaped side 31 of the collar 30, and the small flat (inner) end 48 of pin 14 butts to the other flat donut-shaped side 31' of the collar 30.

A bolt 60 illustrated with a head 62 on one end and an opposite threaded end 64 is inserted in the central axis hole 24 of the first cap 20, through the central axis bolt hole of the pins-and-collet pre-assembly, and then inserted in the central axis hole 24' of the second cap 22. The head 62 of the bolt may be hexagonal as illustrated in FIG. 6, but any shape of the head 62 is believed to be suitable. A nut 66 is threaded on the threaded end 64 of the bolt 60 to tighten the pins-and-collet pre-assembly together. The nut 66 may be any type of nut whose thread matches that of the threaded end 64 of the bolt 60. Nut 66 is preferably a 'super' nut installed with a washer and a ring of set screws to tighten it. The bolt pulls the collet 18 into contact with the pins 12, 14, so that the inner tapered surface 32 of the collet 18 is pressed by the matching outer tapered surface 42 of the pin 12 and similarly the inner tapered surface 34 of the collet 18 is pressed by the matching outer tapered surface 52 of the pin 14.

Although not illustrated, the bolt may have two threaded ends (instead of a head and a threaded end), in which case the tightening of the bolt through the pins-and-collet pre-assembly may be carried out by tightening two nuts on both threaded ends of the bolt.

The bolt 60 may be sized from a centimeter to a few inches (e.g., from 1 cm to 7 cm, preferably from 2 to 5 cm, more preferably from 3 to 4 cm). A preferred bolt may be a 36-mm Grade bolt.

Set screws 25 inserted into holes 26 in end cap 20 and set screws 25' into holes 26' in end cap 22 load against the caps and exert a force on the pins opposite to that exerted by the tightened bolt 60. These forces help to securely fasten the bolt 60 into place and keep the bolt 60 from ever coming loose.

The small threaded holes (26) used for the set screws (25) are positioned on the first (front-end) cap 20 such that the tip of each set screw 25 comes in contact with the outer flat surface 40 of the pin 12. Similarly, the small threaded holes (26') for the set screws (25') are positioned on the second (back-end) cap 22 such that the tip of each set screw 25' comes in contact with the outer flat surface 50 of the pin 14.

It is easier to equally space the set screw holes 26 along one circumference on cap 20 so as to even out the exerted force on the pin's outer flat end 40, such circumference having a diameter greater than the diameters of pin bore 36 and cap central axis hole 24 and also smaller than the diameter of the larger flat end 40 of pin 12 which faces the protuding surface 55 of the first end cap 20. Similarly, it is easier to equally space the set screw holes 26' along one circumference on second end cap 22 so as to even out the exerted force on the pin's outer flat end 50, such circumference having a diameter greater than the diameters of pin bore 46 and cap central axis hole 24' and also smaller than the diameter of the larger flat end 50 of pin 14 which faces the protuding surface 55' of the end cap 22.

To demount the assembly, the set screws 25, 25' are removed; the nut 66 is removed from the threaded end 64 of the bolt 60; the bolt 60 is loosened and removed from the pins-and-collet pre-assembly; and the tapered pins 12, 14 are finally disengaged from the collet 18.

FIG. 3b illustrates a side view of another pin-and-collet assembly (10') in an assembled state according to some embodiments of the present invention. The assembly of FIG. 3b differs from that of FIG. 3a in that the outer ends of the pins which come in contact with the end caps are not flat. First pin 112 and second pin 114 have an outer end 140 and 150 with a surface which is concave, and the protuding surfaces 155 and 155' of the first and second caps 120 and 122, respectively, are convex in such a manner to come in contact with the outer ends 140 and 150 of pins 112 and 114, respectively. Another difference illustrated in FIG. 3b is that the fasteners are cup-point set screws 125, 125' which are threaded on threaded holes 126, 126' of the first and second end caps 120, 122.

FIG. 3c illustrates a side view of yet another pin-and-collet assembly (10") in an assembled state according to some embodiments of the present invention. The assembly of FIG. 3c differs from that of FIG. 3a in that only a portion of each of the first and second pins 212, 214 is tapered, and each section of the collet 218 which is adapted to receive such pin also comprises a corresponding tapered portion with matching taper angle, the remainder of each pin and of each collet section being cylindrical. In such a manner, the tapered portion of the inner surface of each collet section makes contact with the tapered portion of the outer circumferential surface of the pin that such collet section is adapted to receive. As illustrated in FIG. 3c, the first pin 212 has an outer circumferential tapered surface portion 242a and an outer circumferential cylindrical surface portion 242b; similarly second pin 214 has an outer circumferential tapered surface portion 252a and an outer circumferential cylindrical surface portion 252b. Another difference illustrated in FIG. 3c is that the fasteners 225, 225' are non-threaded and are inserted into non-threaded holes 226, 226' of the first and second end caps 220, 222.

It is to be understood that any of the fasteners 25, 125, 225 and paired holes 26, 126, 226 may be interchanged. For example, set screws 125 with cup-point tip illustrated in FIG. 3b may be used in another embodiment of the assembly of any such as illustrated in FIG. 1, FIG. 3a, and FIG. 3c.

FIG. 4 illustrates an exploded isometric view of a demountable assembly in an unassembled state according to some embodiments. The front end of collet 18 defines a first aperture 56 which matches the taper angle of the first pin 12 and the size of the outer tapered surface 42 of the first pin 12. This view also shows the other pin 14 with its central axis bore 46, the caps 20, 22 with the set screws holes 26, 26' and bolt boles 24, 24', and also the threaded end of the bolt 60 which is to be passed through second cap's hole central axis 24'.

FIG. 5 illustrates an isometric view of the demountable assembly in an assembled state according to some embodiments of the present invention, in which the pins are already inserted into the assembly and are not visible when installed in bores of a longwall shearer to attach the ranging arm to a lifting bracket of the shearer.

FIG. 6 illustrates a top view of an end cap of a pins-and-collet assembly in an assembled state according to some embodiments of the present invention. On this outside view of the end cap 20, the hexagonal bolt head 62 is surrounded by the first peripheral holes 26 which are adapted to receive the first fasteners 25. The five peripheral holes 26 are arranged in a hexagonal pattern (equally spaced) along a particular circumference.

FIG. 7 illustrates a side view of a ranging arm which is attached to a lifting bracket of a longwall shearer using one or more assemblies 10* according to some embodiments of the present invention, wherein each of said assemblies 10* may be any of the assemblies 10, 10', 10" described in the context of FIG. 3a-3c or any assembly comprising any combination or sub-combination of their particular features. The longwall shearer (not illustrated) comprises a lifting bracket 72 and a ranging arm 70 which includes a motor 74. The ranging arm 70 of the shearer is securely fastened to the lifting bracket 72 on the motor housing side of the arm by way of two pins-and-collet assemblies 10*. The pins-and-collet assemblies 10* are shown installed through a bore of the lifting bracket and motor shroud housing. One of the end cap for each of the two assemblies 10* is illustrated on FIG. 7 with five peripheral holes into which fasteners (e.g., set screws) have been inserted and a centrally-located bolt head (which is shown of hexagonal shape, but the bolt head may be of any other shape).

In any of the embodiments, the parts of the assembly may be made of suitable material of construction. The pins, collet, bolt, end caps, and fasteners (e.g., set screws) are preferably made of steel.

It should be noted that any feature described for one embodiment is interchangeable with another embodiment unless otherwise stated.

The present invention also related to a method for securely fastening a ranging arm to a lifting bracket of a longwall shearer, which comprises using the pin-and-collet assembly as described in any of the various embodiments to attach the ranging arm to the lifting bracket.

Since the assembly is demountable, the ranging arm can be removed from the lifting bracket for example for maintenance and/or for panel move. To demount this assembly, the fasteners would be first removed from the front and back ends of the assembly; the bolt would be untightened by loosening the nut(s) on the threaded end(s) of the bolt; the end caps covering the front and back ends of the collet would be removed, and the pins would then be removed from the collet.

The longwall shearer system employing the pin-and-collet assembly is particularly useful for the mining of a trona bed. The mining method comprises mining at least a portion of the ore bed to extract non-combustible ore using a ranging arm of a longwall shearer, such method which includes using any of the various embodiments of the pin and collet assembly of the present invention to attach the ranging arm to the lifting bracket of the shearer, preferably to the motor housing side of the arm.

The mining step according to the present invention extracts non-combustible ore from an underground (subterranean) formation which comprises at least a non-combustible ore bed to be mined.

It should be understood that any following or foregoing embodiments which are described in terms of trona mining are equally applicable to the mining of other non-combustible ore or coal, unless otherwise stated.

The non-combustible ore bed preferably contains a desired mineral, a metal/non-metal ore, or a precursor thereof which can be obtained by processing the mined ore in a surface refinery. In preferred embodiments, the ore bed to be mined may comprise an evaporite mineral. A suitable evaporite mineral may comprise an element selected from the group consisting of halite, carbonate, sesquicarbonate, bicarbonate, nitrate, iodate, borate, sulfate, and phosphate. In some embodiments, the evaporite mineral may be selected from the group consisting of trona, nahcolite, Wegscheiderite, halite, potash, langbeinite, sylvite, and carnalite. In preferred embodiments, the non-combustible ore bed to be mined comprises at least one evaporite mineral selected from the group consisting of trona, nahcolite, and Wegscheiderite. The non-combustible ore preferably comprises sodium carbonate, sodium bicarbonate, sodium sesquicarbonate, or combinations thereof. The ore bed preferably contains a desired sodium mineral or a precursor thereof which is selected from the group consisting of sodium sesquicarbonate, sodium bicarbonate, and sodium carbonate. In alternate embodiments, the non-combustible ore bed contains potash.

In more preferred embodiments, the non-combustible ore bed comprises trona or any evaporite deposit containing sodium sesquicarbonate, carbonate and/or bicarbonate, or even more preferably consists of a trona bed.

A trona bed or seam may have a thickness of from a few inches to 30 feet (0.1 m-9.1 m). Mechanically mineable trona seams are typically considered to be greater than six feet thick (2 m). The trona seams may be located at a depth of from 244 to 910 meters (from about 800 to 3000 feet) below the surface. A trona bed is generally higher in compressive strength than the overlying and underlying strata.

Trona ore is a mineral that contains about 90-95% sodium sesquicarbonate ($Na_2CO_3 \cdot NaHCO_3 \cdot 2H_2O$). A vast deposit of the mineral trona is found in southwestern Wyoming near Green River. This deposit includes layers of trona and mixed trona and halite (rock salt or NaCl) which covers approximately 2,600 $km^2$. The major trona beds range in size from less than 428 $km^2$ to at least 1,870 $km^2$. By conservative estimates, these major trona beds contain about 75 billion metric tons of ore. The different beds overlap each other and are separated by layers of shale and marlstone. The quality of the trona varies depending on its particular location in the stratum.

A typical analysis of the trona ore mined in Green River is as follows:

TABLE 1

| Constituent | Weight Percent |
| --- | --- |
| $Na_2CO_3$ | 43.2 |
| $NaHCO_3$ | 33.7 |
| $H_2O$ (crystalline and free moisture) | 15.6 |
| NaCl | 0.1 |
| Insolubles | 7.3 |

The sodium sesquicarbonate found in trona ore is a complex salt that is soluble in water. The mined trona ore is processed generally in a surface refinery to remove the insoluble material, organic matter and other impurities to recover the valuable alkali contained in the trona.

The most valuable alkali produced from trona is sodium carbonate. Sodium carbonate is one of the largest volume alkaline commodities produced in the United States. In 2007, trona-based sodium carbonate from Wyoming comprised about 91% of total U.S. soda ash production. Sodium carbonate finds major use in the glass-making industry and for the production of baking soda, detergents and paper products.

The trona deposits found in Southwestern Wyoming are formed in multiple beds in the Wilkins Peak Member of the Eocene Green River Formation at depths ranging from 240 to 910 meters (800-3000 feet). The Wyoming trona deposits are evaporites that form substantially horizontal beds. The beds vary greatly in thickness, from about 0.3 meter to about 5 meters (about 1-16 feet).

The longwall mining method comprises:
providing at least a first (initial) mined-out cavity into an underground formation, the first cavity giving access to a first (initial) working face of the ore bed to be mined;
mining a region of the ore from the first (initial) working face using a ranging arm which is attached to a lifting bracket of a longwall shearer via the assembly according to any embodiment of the present invention;
removing the mined ore via a face conveyor, thereby creating a second (subsequent) mined-out cavity with a second (subsequent) working face;
advancing the mining step to another ore region from the second (subsequent) working face (that is to say moving the roof support, the face conveyor, the track assembly, and the shearer towards the second working face to enable the shearer to continue mining);
as the mine face recedes, allowing the top of the first (initial) mined-out cavity to cave so as to create a gob; and
repeating the mining, advancing and caving steps in a manner effective to enlarge the volume of the gob while reducing the volume of ore to be mined.

This disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein by reference conflict with the present specification to the extent that it might render a term unclear, the present specification shall take precedence.

In the application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Further, it should be understood that elements and/or features of an apparatus, a process, or a method described herein can be combined in a variety of ways without departing from the scope and disclosures of the present teachings, whether explicit or implicit herein.

The use of the singular herein includes the plural (and vice versa) unless specifically stated otherwise.

In addition, where the use of the term "about" is before a quantitative value, the present teachings also include the specific quantitative value itself, unless specifically stated otherwise. As used herein, the term "about" refers to a +−10% variation from the nominal value.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

We claim:

1. An assembly for fastening two parts together, comprising:
a first pin comprising a first central axis bore therethrough and a first outer circumferential surface;
a second pin comprising a second central axis bore therethrough and a second outer circumferential surface;
a collet comprising an inner collar defining a central axis aperture and comprising two collet sections divided by said inner collar, said collet comprising a first section adapted to receive the first pin, the first collet section having an inner surface which makes contact with the first outer circumferential surface of the first pin, said collet further comprising a second section adapted to receive the second pin, the second collet section having an inner surface which makes contact with the second outer circumferential surface of the second pin;
a first end cap comprising a central axis hole bored therethrough and being adapted to cover one outer end of the first pin, wherein the first end cap has a plurality of first peripheral holes, each first peripheral hole being adapted to receive a first fastener;
a second end cap comprising a central axis hole bored therethrough and being adapted to cover an outer end of the second pin, wherein the second end cap has a plurality of second peripheral holes, each second peripheral hole being adapted to receive a second fastener;
a bolt adapted to pass through the central axis hole of one of the first and second end caps, the central axis bore of one of the first and second pins, the collar central axis aperture, the central axis bore of the other pin, and the central axis hole of the other end cap, said bolt comprising at least one threaded end onto which a nut is threaded to tighten the first and second pins into place inside the collet;
a plurality of first fasteners adapted to be inserted into the plurality of first peripheral holes of the first end cap and to exert a force on the first pin; and
a plurality of second fasteners adapted to be inserted into the plurality of second peripheral holes of the second end cap and to exert a force on the second pin;
wherein each of the first and second pins, the collet, and each of the first and second end caps have a common central axis.

2. The assembly according to claim 1, wherein the outer end of at least one pin which is in contact with a face of an end cap is flat, and wherein the face of the end cap being in contact with the pin flat outer end is also flat.

3. The assembly according to claim 1, wherein the outer end of at least one of the first and second pins which is in contact with a face of an end cap is concave, and wherein the face of the end cap which is in contact with such pin concave outer end is convex.

4. The assembly according to claim 1, wherein the first and second fasteners are set screws, and wherein each of the first and second peripheral holes is threaded to receive one set screw.

5. The assembly according to claim 1, wherein at least one of the first and second pins is tapered, and wherein the collet section adapted to receive such tapered pin is also tapered with a matching taper angle.

6. The assembly according to claim 1, wherein the first peripheral holes are positioned on the first end cap such that each first fastener to be inserted through one of said first peripheral holes has a tip which comes in contact with the outer end surface of the first pin, and wherein the second peripheral holes are positioned on the second end cap such that each second fastener to be inserted through one of said second peripheral holes has a tip which comes in contact with the outer end surface of the second pin.

7. The assembly according to claim 1, wherein the first peripheral holes are equally spaced along one circumference on the first end cap so as to even out the exerted force on the outer end of the first pin, and wherein the second peripheral holes are equally spaced along one circumference on the second end cap so as to even out the exerted force on the outer end of the second pin.

8. The assembly according to claim 1, wherein the first and second pins have different lengths.

9. The assembly according to claim 1, wherein the first and second end caps have different heights and/or widths.

10. The assembly according to claim 1, wherein the inner collar of the collet is cylindrical-shaped.

11. An assembly for fastening a ranging arm to a lifting bracket of a longwall shearer, comprising:
a first tapered pin comprising a first central axis bore therethrough and a first outer circumferential tapered surface;
a second tapered pin comprising a second central axis bore therethrough and a second outer circumferential tapered surface;
a collet comprising an inner collar defining a central axis aperture and two collet tapered sections divided by said inner collar, said collet comprising a first collet tapered section adapted to receive the first tapered pin, the first collet tapered section having an inner surface which makes contact with the first outer circumferential tapered surface of the first tapered pin, said collet further comprising a second collet section adapted to receive the second pin, the second collet tapered section having an inner surface which makes contact with the second outer circumferential tapered surface of the second tapered pin;
a first end cap comprising a central axis hole bored therethrough and being adapted to cover one flat outer end of the first tapered pin, wherein the first end cap has a plurality of first peripheral holes, each first peripheral hole being externally threaded to receive a fastener which is a set screw with matching threading;
a second end cap comprising a central axis hole bored therethrough and being adapted to cover one flat outer end of the second tapered pin, wherein the second end cap has a plurality of second peripheral holes, each peripheral hole being externally threaded to receive a fastener which is a set screw with matching threading;
a bolt adapted to pass through the central axis hole of one of the first and second end caps, the central axis bore of one of the first and second tapered pins, the collar central axis aperture, the central axis bore of the other tapered pin, and the central axis hole of the other end cap, said bolt comprising at least one threaded end onto which a nut is threaded to tighten the first and second tapered pins into place inside the collet;
a plurality of first fasteners to be threaded into the plurality of first peripheral holes of the first end cap and to exert a force on the first tapered pin; and
a plurality of second fasteners to be threaded into the plurality of second peripheral holes of the second end cap and to exert a force on the second tapered pin;
wherein each of the first and second tapered pins, the collet, and each of the first and second end caps have a common central axis.

12. The assembly according to claim 11, wherein the inner collar of the collet is cylindrical-shaped.

13. The assembly according to claim 12, wherein the inner cylindrical-shaped collar of the collet is protruding transversely relative to two first and second tapered collet sections, the cylindrical-shaped collar being located between said first and second tapered collet sections.

14. A longwall shearer, comprising a ranging arm attached to a lifting bracket with assembly according to claim 1.

15. A method for securely fastening a ranging arm to a lifting bracket of a longwall shearer, comprising:
the assembly according to claim 1 as a hushing.

16. The method according to claim 15, comprising
inserting the collet into a bore on the longwall shearer;
inserting the first and second pins on either side of the collet, so that the inner surface of the first collet section comes in contact with the first outer circumferential surface of the first pin, and the inner surface of the second collet section comes in contact with the second outer circumferential surface of the second pin;
after insertion of the first and second pins into the collet, covering one end of the collet with one end cap and covering the other end of the collet with the other end cap;
inserting a bolt through the central axis hole of the first end cap, the central axis bore of the first pin, the central axis aperture of the collar, the central axis bore of the second pin, and through the central axis hole of the second end cap;
fastening the bolt by threading a nut on at least one threaded end of said bolt;
inserting a first fastener in each first peripheral hole in the first end cap; and
inserting a second fastener in each second peripheral hole in the second end cap.

17. The method according to claim 16, wherein the first peripheral holes are positioned on the first end cap such that each first fastener inserted through one of said first peripheral holes has a tip which comes in contact with the outer end surface of the first pin to exert a force on said outer end of the first pin; and wherein the second peripheral holes are positioned on the second end cap such that each second fastener inserted through one of said second peripheral holes has a tip which comes in contact with the outer end surface of the second pin to exert a force on said outer end of the second pin.

18. The method according to claim 16, wherein the first peripheral holes are equally spaced along one circumference on the first end cap so as to evenly exert a force on the outer end of the first pin, and wherein the second peripheral holes are equally spaced along one circumference on the second end cap so as to evenly exert a force on the outer end of the second pin.

19. A method for longwall mining ore, which comprises
securely fastening a ranging arm of a longwall shearer to a
lifting bracket of the longwall shearer on a motor housing side using the assembly according to claim 1 as a bushing; and
cutting ore from a mine longwall face with a toothed drum positioned at an end of the ranging arm of the longwall shearer.

20. A longwall shearer, comprising a ranging arm attached to a lifting bracket with the assembly according to claim 11.

* * * * *